(12) United States Patent
Fuchs et al.

(10) Patent No.: US 12,524,517 B2
(45) Date of Patent: Jan. 13, 2026

(54) ASYNCHRONOUS COUNTING GATE

(71) Applicant: Oracle International Corporation, Redwood Shores, CA (US)

(72) Inventors: Daniel Jean-Michel Fuchs, Dublin (IE); Daniel Jeliński, Gdańsk (PL); Jaikiran Pai, Dharwad (IN)

(73) Assignee: Oracle International Corporation, Redwood Shores, CA (US)

( * ) Notice: Subject to any disclaimer, the term of this patent is extended or adjusted under 35 U.S.C. 154(b) by 37 days.

(21) Appl. No.: 18/741,396

(22) Filed: Jun. 12, 2024

(65) Prior Publication Data

US 2025/0384119 A1 Dec. 18, 2025

(51) Int. Cl.
  *G06F 21/00* (2013.01)
  *G06F 21/44* (2013.01)
(52) U.S. Cl.
  CPC .................................. *G06F 21/44* (2013.01)
(58) Field of Classification Search
  CPC .......................................................... G06F 21/44
  See application file for complete search history.

(56) References Cited

U.S. PATENT DOCUMENTS

| | | | |
|---|---|---|---|
| 7,844,973 B1 | 11/2010 | Dice | |
| 7,912,064 B2 | 3/2011 | Elzur | |
| 8,640,230 B2 * | 1/2014 | Greenwood | G06F 21/6218 726/21 |
| 9,553,951 B1 | 1/2017 | Nguyen et al. | |
| 9,898,349 B2 | 2/2018 | Gentile et al. | |
| 9,952,912 B2 | 4/2018 | Omara et al. | |
| 11,050,682 B2 | 6/2021 | Kantecki et al. | |
| 11,263,061 B2 | 3/2022 | Richter | |

(Continued)

FOREIGN PATENT DOCUMENTS

| | | | |
|---|---|---|---|
| CN | 105069081 A | 11/2015 | |
| CN | 110622449 A | 12/2019 | |

(Continued)

OTHER PUBLICATIONS

"On the design and implementation of the QUIC protocol," Retrieved from https://quic.edm.uhasselt.be/files/quicker_KevinPittevils_August2018.pdf, UHASSELT, 2018, 69 pages.

(Continued)

*Primary Examiner* — Rodman Alexander Mahmoudi
(74) *Attorney, Agent, or Firm* — Invoke

(57) ABSTRACT

Techniques are disclosed for restricting access to a computing resource in a manner that does not block the performance of other operations in a multi-thread computing environment. A software gate receives a request from a thread for permission to access a computing resource. Responsive to receiving the request, the software gate determines that a dynamic permit limit currently prevents the request from being granted. The software gate returns a data structure indicating that the request is incomplete, adds the request to a queue of pending requests, and releases the thread. Once released, the thread is free to perform other operations while the request is pending. If the request subsequently becomes allowable, the software gate grants the request, removes the request from the queue, and updates the data structure to indicate the request is complete.

20 Claims, 10 Drawing Sheets

(56) References Cited

U.S. PATENT DOCUMENTS

| | | | |
|---|---|---|---|
| 2004/0141486 A1 | 7/2004 | Suri et al. | |
| 2006/0256722 A1 | 11/2006 | Taha et al. | |
| 2008/0162481 A1 | 7/2008 | Sadjadi | |
| 2009/0161568 A1 | 6/2009 | Kastner | |
| 2011/0285731 A1* | 11/2011 | Andre | G06F 13/4234 |
| | | | 345/541 |
| 2017/0031729 A1* | 2/2017 | Grochowski | G06F 9/52 |
| 2017/0109209 A1* | 4/2017 | Bailey | G06F 9/526 |
| 2019/0243682 A1 | 8/2019 | Botelho | |
| 2020/0067634 A1 | 2/2020 | Medard et al. | |
| 2022/0377019 A1 | 11/2022 | Rao et al. | |
| 2023/0376348 A1 | 11/2023 | Nield et al. | |

FOREIGN PATENT DOCUMENTS

| | | |
|---|---|---|
| CN | 111949391 A | 11/2020 |
| CN | 115714826 A | 2/2023 |
| KR | 10-0366018 B1 | 12/2002 |
| WO | 2004/094863 A2 | 11/2004 |

OTHER PUBLICATIONS

"Package java. util.concurrent", Jun. 19, 2024, pp. 10.

"quartz.net", Retrieved from https://www.quartz-scheduler.net/, Retrieved on Feb. 23, 2024, pp. 2.

"Rescheduling Jobs", Retrieved from https://www.quartz-scheduler.net/documentation/quartz-3.x/how-tos/rescheduling-jobs.html, Retrieved on Feb. 18, 2024, pp. 2.

"Tasker", Retrieved from https://tasker.joaoapps.com/, Retrieved on Jun. 24, 2024, pp. 1-3.

"The magic behind Monotonics", Retrieved from https://rtic.rs/2/book/en/monotonic_impl.html, Retrieved on Feb. 23, 2024, pp. 2.

"Use Tasker to wake up my device at specified intervals", Retrieved from https://groups.google.com/g/tasker/c/rZOD9WsJ8Ow?pli=1, Retrieved on Jun. 24, 2024, pp. 1-4.

Frincu et al., "Self-Healing Distributed Scheduling Platform", Jun. 17, 2011, pp. 11.

Hedayati et al., "Multi-Queue Fair Queuing", 2019 USENIX Annual Technical Conference, Jul. 10-12, 2019, pp. 301-314.

Kohutka et al., "A New FPGA-Based Task Scheduler for Real-Time Systems", Task Scheduler for Real-Time Systems. Electronics Apr. 15, 2023, vol. 12, 1870, pp. 1-18.

Lotan et al., "Skiplist-Based Concurrent Priority Queues", Proceedings 14th International Parallel and Distributed Processing Symposium. IPDPS, 2000, pp. 23.

Mioli S., "Rescheduling a Quartz.NET Job From Within Itself", Retrieved from https://www.linkedin.com/pulse/rescheduling-quartznet-job-from-within-itself-stefano-mioli, Mar. 27, 2023, pp. 1-7.

Schmidt et al., "The Design and Use of the ACE Reactor An Object-Oriented Framework for Event Demultiplexing", 1998, pp. 1-21.

Wu et al., "Decentralized Max-Min Resource Allocation for Monotonic Utility Functions", IEEE INFOCOM 2021—IEEE Conference on Computer Communications Workshops (INFOCOM WKSHPS), Jul. 19, 2021, pp. 3.

Zheng et al., "LuisaRender: A High-Performance Rendering Framework with Layered and Unified Interfaces on Stream Architectures", ACM Trans. Graph., vol. 41, No. 6, Article 232, Dec. 2022, pp. 1-19.

* cited by examiner

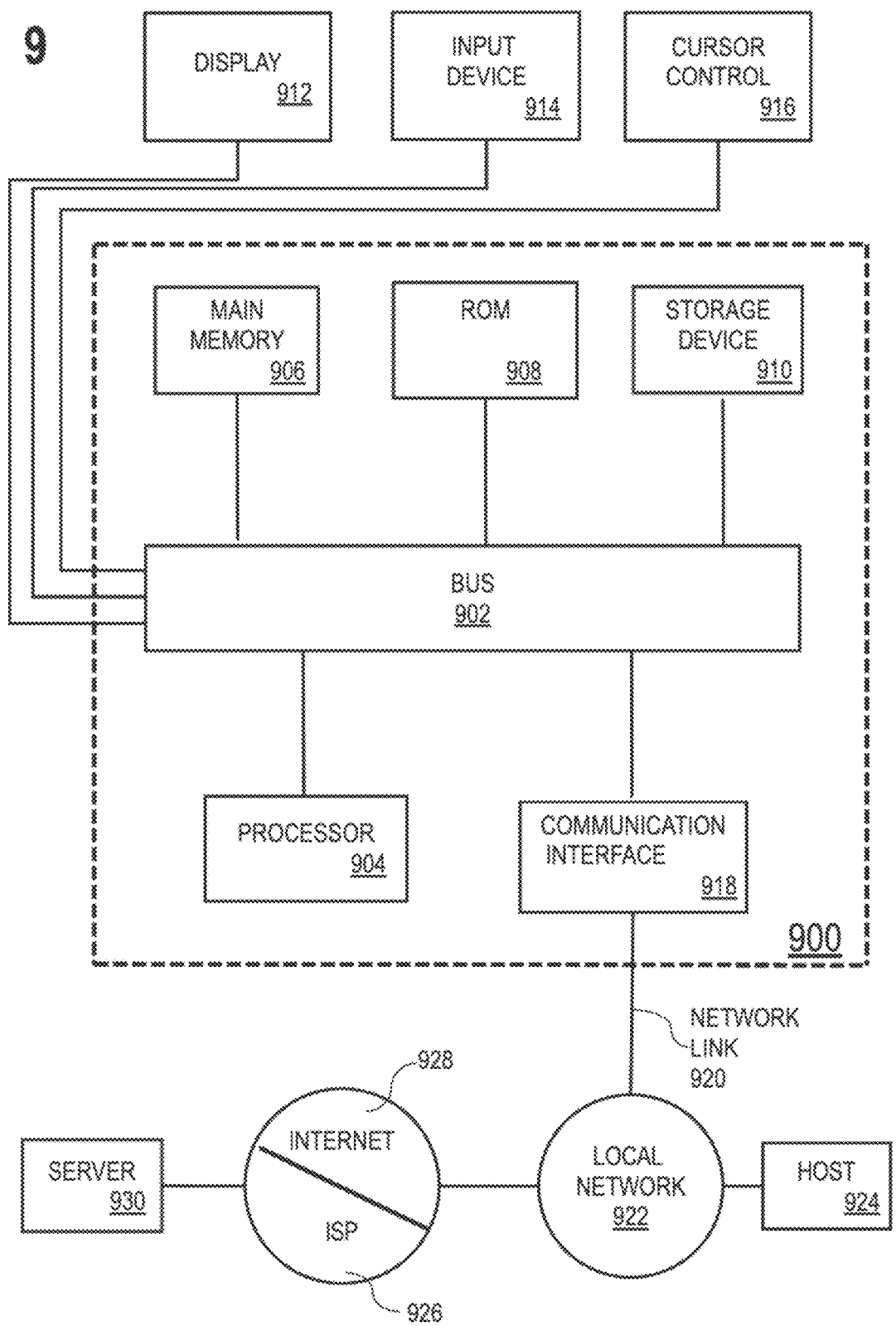

ASYNCHRONOUS COUNTING GATE

TECHNICAL FIELD

The present disclosure relates to a mechanism for policing access to a computing resource.

BACKGROUND

A "thread" is a basic unit of program execution. While the traits and behaviors of threads may vary between different computing environments, a thread can generally be conceptualized as a component of a process. If a process includes threads, the process may include a single thread or multiple threads. Each thread of a process may serve as an independent execution environment for program tasks. The inclusion of one or more threads in a process may enable the process to perform at least some program tasks concurrently.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 9 illustrates a computer system that may be utilized to practice techniques described herein in accordance with one or more embodiments.

DETAILED DESCRIPTION

Figure 1:
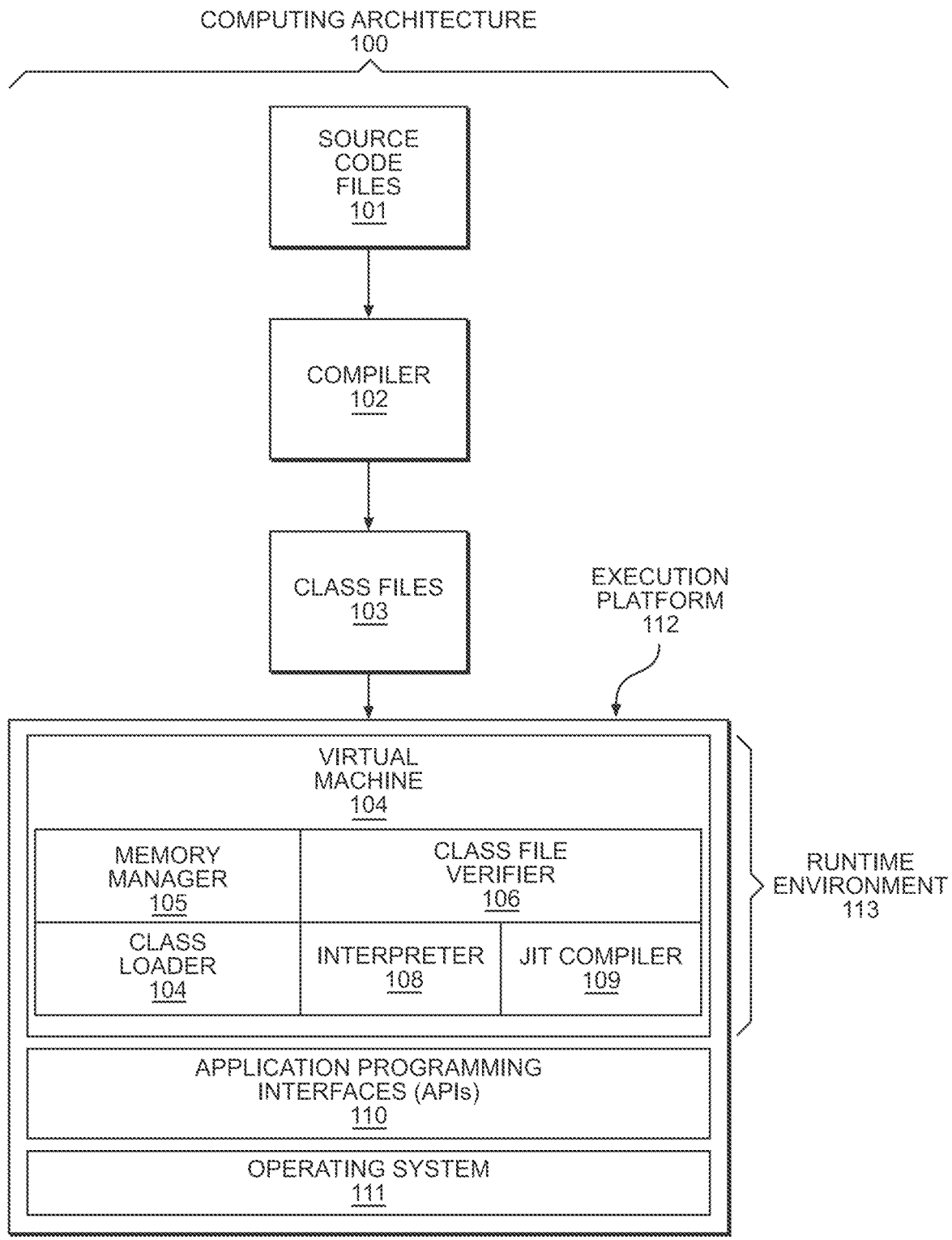
FIG. 1 illustrates an example computing architecture that may be utilized to practice techniques described herein in accordance with one or more embodiments.

In the following description, for the purposes of explanation, numerous specific details are set forth to provide a thorough understanding. One or more embodiments may be practiced without these specific details. Features described in one embodiment may be combined with features described in a different embodiment. In some examples, well-known structures and devices are described with reference to a block diagram form to avoid unnecessarily obscuring the present invention.

The following table of contents is provided for the reader's convenience and is not intended to define the limits of the disclosure.

| | |
|---|---|
| 1. | GENERAL OVERVIEW |
| 2. | ARCHITECTURAL OVERVIEW |
| | 2.1. EXAMPLE CLASS FILE STRUCTURE |
| | 2.2. EXAMPLE VIRTUAL MACHINE ARCHITECTURE |
| | 2.3. LOADING, LINKING, AND INITIALIZING |
| 3. | RESPONDING TO A PERMIT REQUEST |
| 4. | ALTERING A PERMIT LIMIT |
| 5. | PROCESSING A QUEUE OF PERMIT REQUESTS |
| 6. | EXAMPLE EMBODIMENT |
| 7. | PRACTICAL APPLICATIONS, ADVANTAGES, & IMPROVEMENTS |
| 8. | HARDWARE OVERVIEW |
| 9. | MISCELLANEOUS; EXTENSIONS |

1. GENERAL OVERVIEW

One or more embodiments process a request from a thread for permission to access to a computing resource in a manner that does not block the thread from performing other operations while the request is pending. Specifically, one or more embodiments allow a limited number of permits to access a given resource. If a thread requests access to a resource and no permits are available, the request may be treated as either denied or incomplete. If the request is treated as incomplete, it is added to a queue. The queue is processed as more permits become available. One or more embodiments respond to a request to access a resource with a data structure that indicates the status of the request (e.g., incomplete, allowed, denied, failed, etc.). If the data structure indicates that the request is incomplete, the calling thread may later refer back to the data structure, to determine whether the status has changed. The calling thread is not blocked from performing other operations (i.e., operations not relating to that particular request) in the meantime. One or more embodiments further allow the calling thread to indicate a set of instructions to execute if the request is granted.

An embodiment receives a permit request from a requestor. The permit request is a request for permission to access a computing resource. The requestor is a program task executing in a thread. The system determines that the permit request is allowable because a permit count for the computing resource is less than a permit limit for the computing resource. The permit count is a number of previously granted permit requests for the computing resource. The permit limit is a constraint on the permit count that may be altered dynamically. Having determined that the permit request is allowable, the system returns a data structure indicating that the permit request is granted.

An embodiment receives a permit request from a requestor. The permit request is a request for permission to access a computing resource. The requestor is a program task executing in a thread. The system determines that the permit request is not currently allowable because a permit count for the computing resource meets a permit limit for the computing resource. The permit count is a number of previously granted permit requests for the computing resource. The permit limit is a constraint on the permit count that may be altered dynamically. Based on a determination that the requestor expects an immediate completion of the permit request, the system returns a data structure indicating that the permit request is denied.

An embodiment receives a permit request from a requestor. The permit request is a request for permission to access a computing resource. The requestor is a program task executing in a thread. The system determines that the permit request is not currently allowable because a permit count for the computing resource meets a permit limit for the computing resource. Based on a determination that the requestor is not expecting an immediate completion of the permit request, the system (a) returns a data structure indicating that the permit request is incomplete and (b) adds the permit request to a queue of permit requests for the computing resource. The system frees the thread to perform other operations while the permit request is still incomplete. If the permit count becomes less than the permit limit prior to the permit request being timed out or canceled, and if the permit request reaches the front of the queue while the permit count is still less than the permit limit, the permit request may be granted. If the permit request is granted, the permit request is removed from the queue and the data structure may be used by the requestor to learn that the permit request is completed successfully.

An embodiment receives a request for a current permit limit to be altered to a requested permit limit. If the current permit limit is greater than or equal to the requested permit limit, the system denies the request. If the current permit limit is less than the requested permit limit, the system increases the current permit limit to the requested permit limit.

An embodiments checks if there are any permits requests waiting in a queue of permit requests for a computing resource. The system checks the queue for permit requests in response to a permit count for the computing resource becoming less than a permit limit for the computing resource. If there are any permit requests waiting in the queue, the system checks the completion status of the permit request at the front of the queue. If the permit request has already been completed, the system removes the permit request from the queue. If the permit request is incomplete, and if the permit count is still less than the permit limit, the system (a) increases the permit count by one, (b) grants the permit request, and (c) removes the permit request from the queue. To reflect the permit request being granted, the system may update the internal state of a data structure corresponding to the permit request. Furthermore, the system inspects the data structure corresponding to the permit request to determine if the data structure includes a set of instructions to be performed in the event of the permit request being completed. For instance, the data structure may include a set of instructions for finishing conducting the remainder of a program task that initiated the permit request. If the data structure includes a set of instructions to be performed in the event of the permit request being completed, the system passes the set of instructions to a separate thread for execution. The system then proceeds onward to evaluate the next permit request in the queue. The system continues to iterate through the queue in this manner until the permit count equals the permit limit or the queue is empty.

An embodiment is alerted to a timeout value of an incomplete permit request for a computing resource elapsing. In response, the system denies the permit request and removes the permit request from the queue. To reflect the permit request being denied, the system may update the internal state of a data structure corresponding to the permit request. The system may further inspect the data structure corresponding to the permit request for a set of instructions to be completed in the event of the permit request being completed. If the data structure includes a set of instructions to be performed in the event of the permit request being completed, the set of instructions may be passed to a separate thread for execution.

An embodiment performs a set of instructions that are registered in a data structure. The data structure corresponds to a permit request. The set of instructions have been registered in the data structure by a requestor of the permit request, or the set of instructions have been registered in the data structure by another party. The system performs the set of instructions responsive to the permit request being completed, and the system may complete the set of instruction in a thread other than the thread that completed the permit request. In an example, the set of instructions specifies different operations for different completion scenarios. Performing the set of instructions in this example causes the system to (a) determine how the permit request has been completed and (b) perform an appropriate set of operations for the present completion scenario. An example set of instructions provides one set of operations to be performed if the permit request is granted, another set of operations to be performed if the permit request is denied, and yet another set of operations to be performed if the permit request fails. Another example set of instructions includes additional sets of operations for other and/or more specific completion scenarios.

An embodiment is alerted to a requestor canceling a permit request for a computing resource. The requestor cancels the permit request by invoking a cancelation method of a data structure corresponding to the permit request. In response, the system removes the permit request from a queue of permits requests for the computing resource.

One or more embodiments described in this Specification and/or recited in the claims may not be included in this General Overview section.

2. ARCHITECTURAL OVERVIEW

FIG. 1 illustrates an example architecture in which techniques described herein may be practiced. Software and/or hardware components described with relation to the example architecture may be omitted or associated with a different set of functionalities than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above-described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilize the features described herein.

In an embodiment, compiler 102 receives as input the source code files 101 and converts the source code files 101 into class files 103 that are in a format expected by the virtual machine 104. For example, in the context of the Java Virtual Machine (JVM), the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
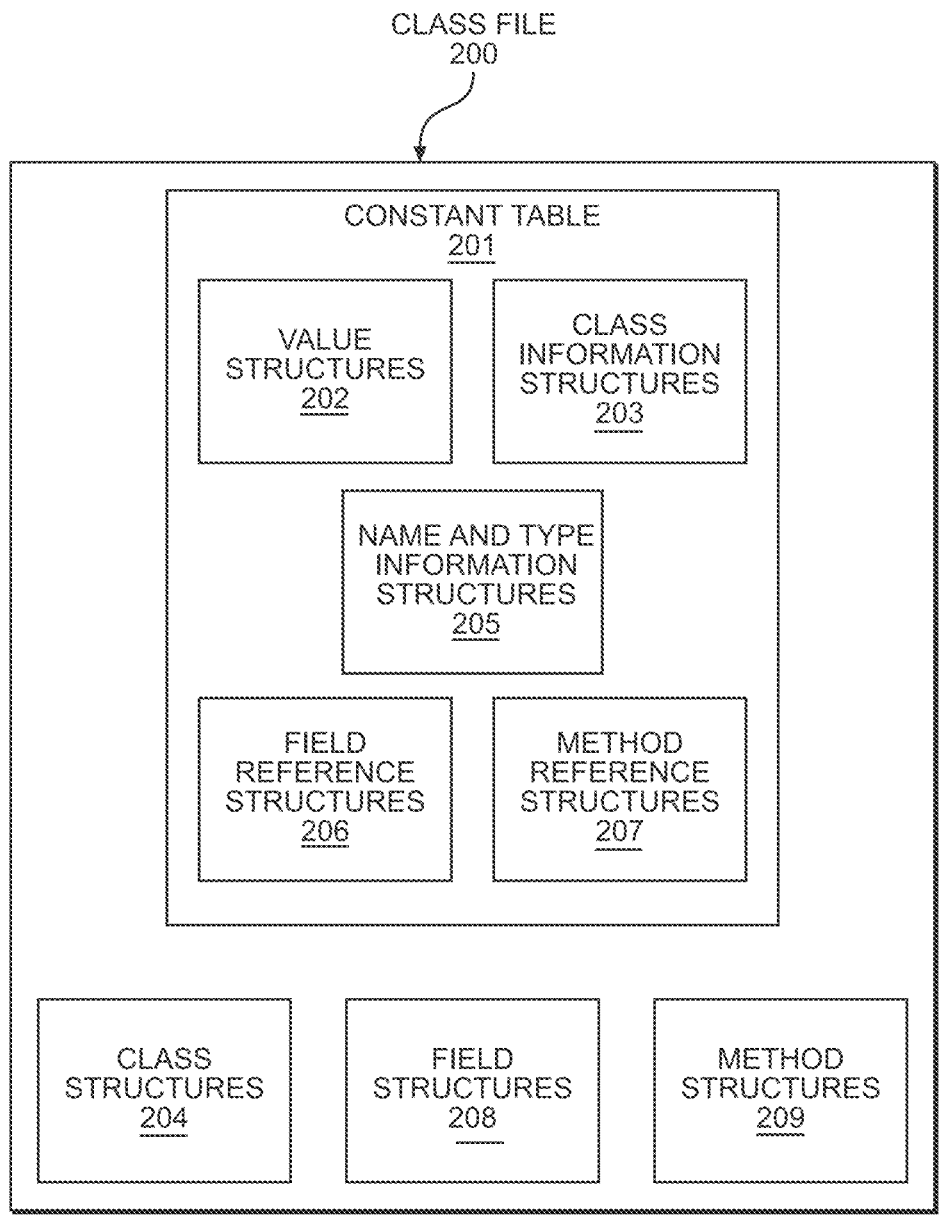
FIG. 2 illustrates an example class file in block diagram form in accordance with one or more embodiments.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

class A
    {
      int add12and13( ) {
        return B.addTwo(12, 13);
      }
    }

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
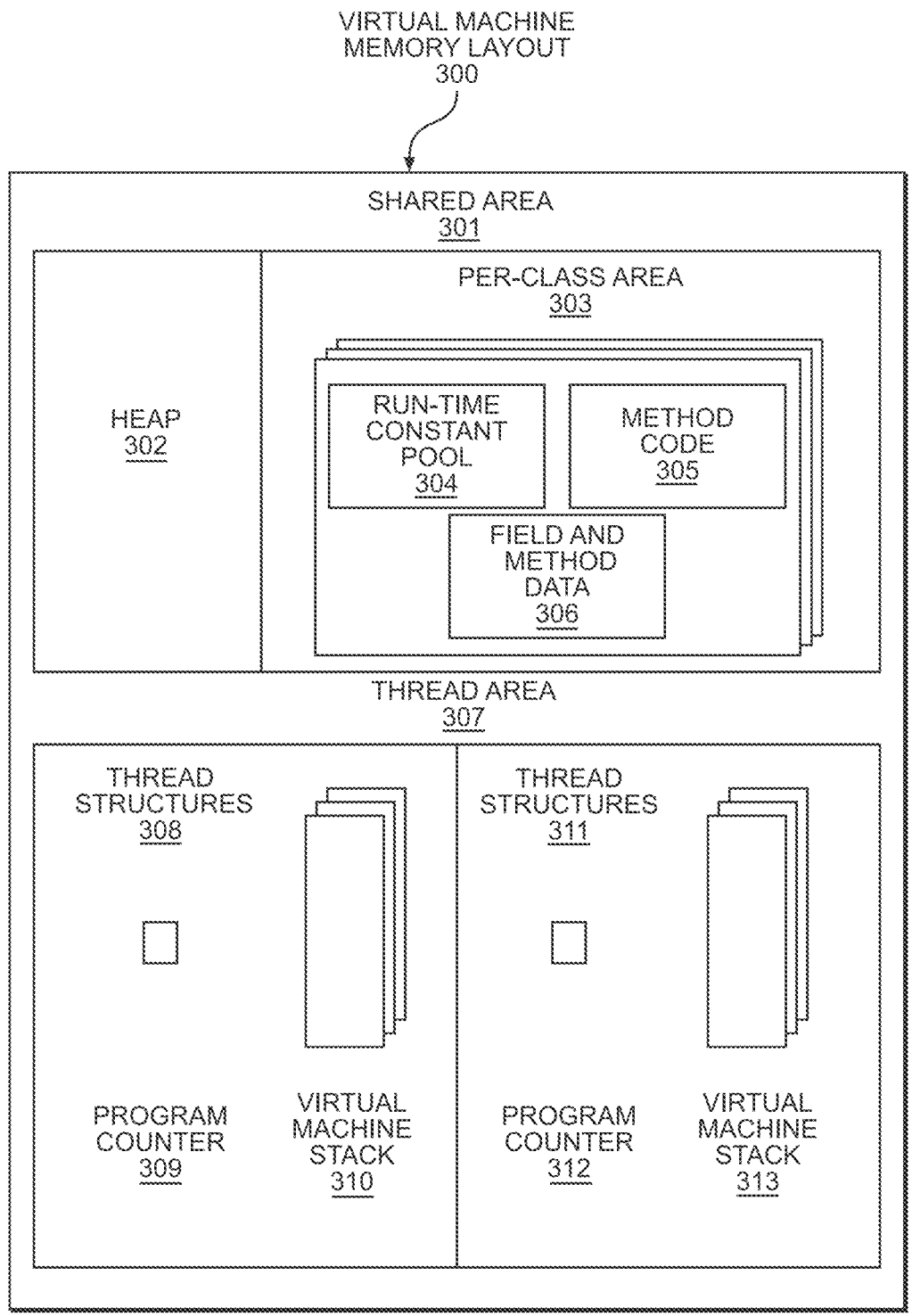
FIG. 3 illustrates an example virtual machine memory layout in block diagram form in accordance with one or more embodiments.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas be contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
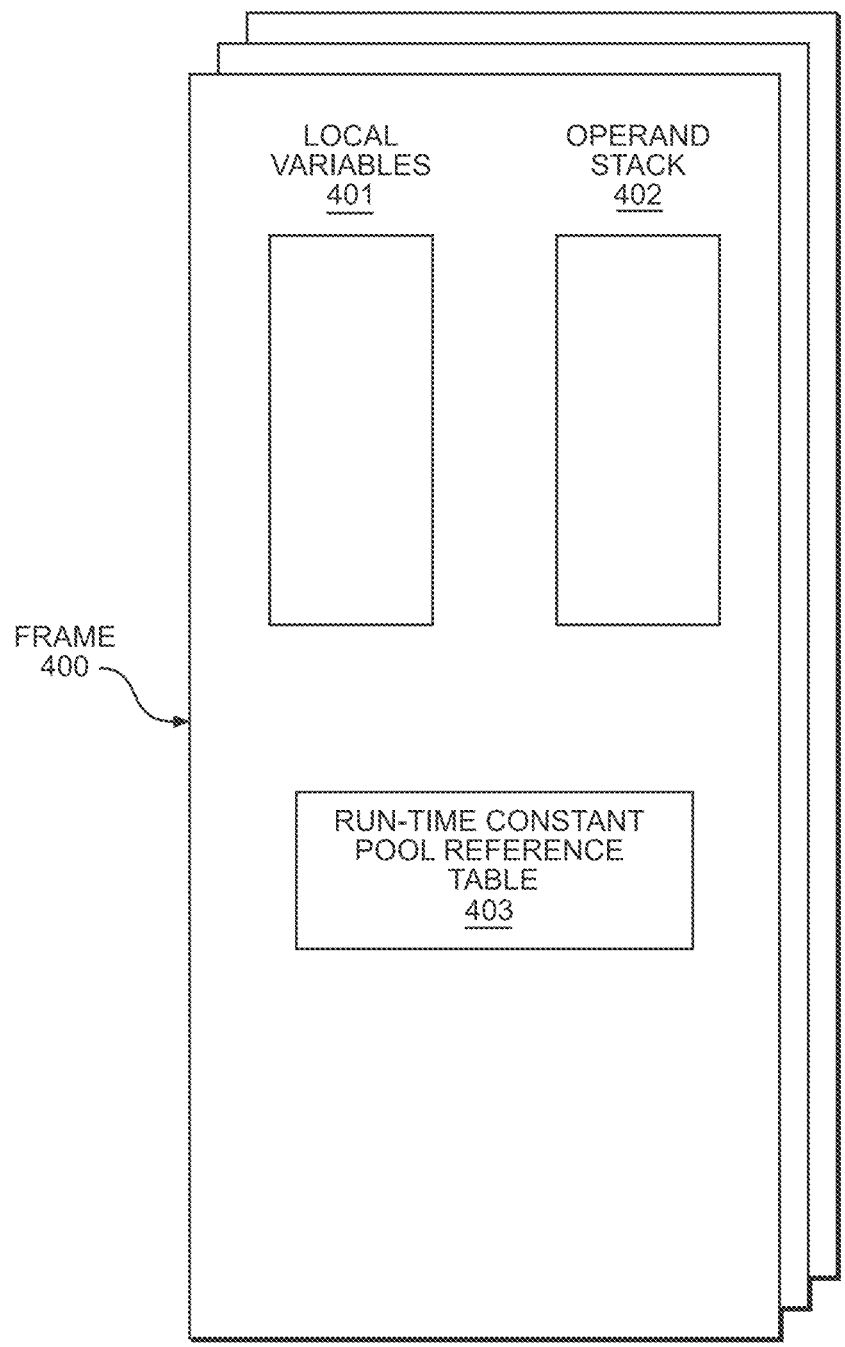
FIG. 4 illustrates an example frame in block diagram form in accordance with one or more embodiments.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. RESPONDING TO A PERMIT REQUEST

Figure 5:
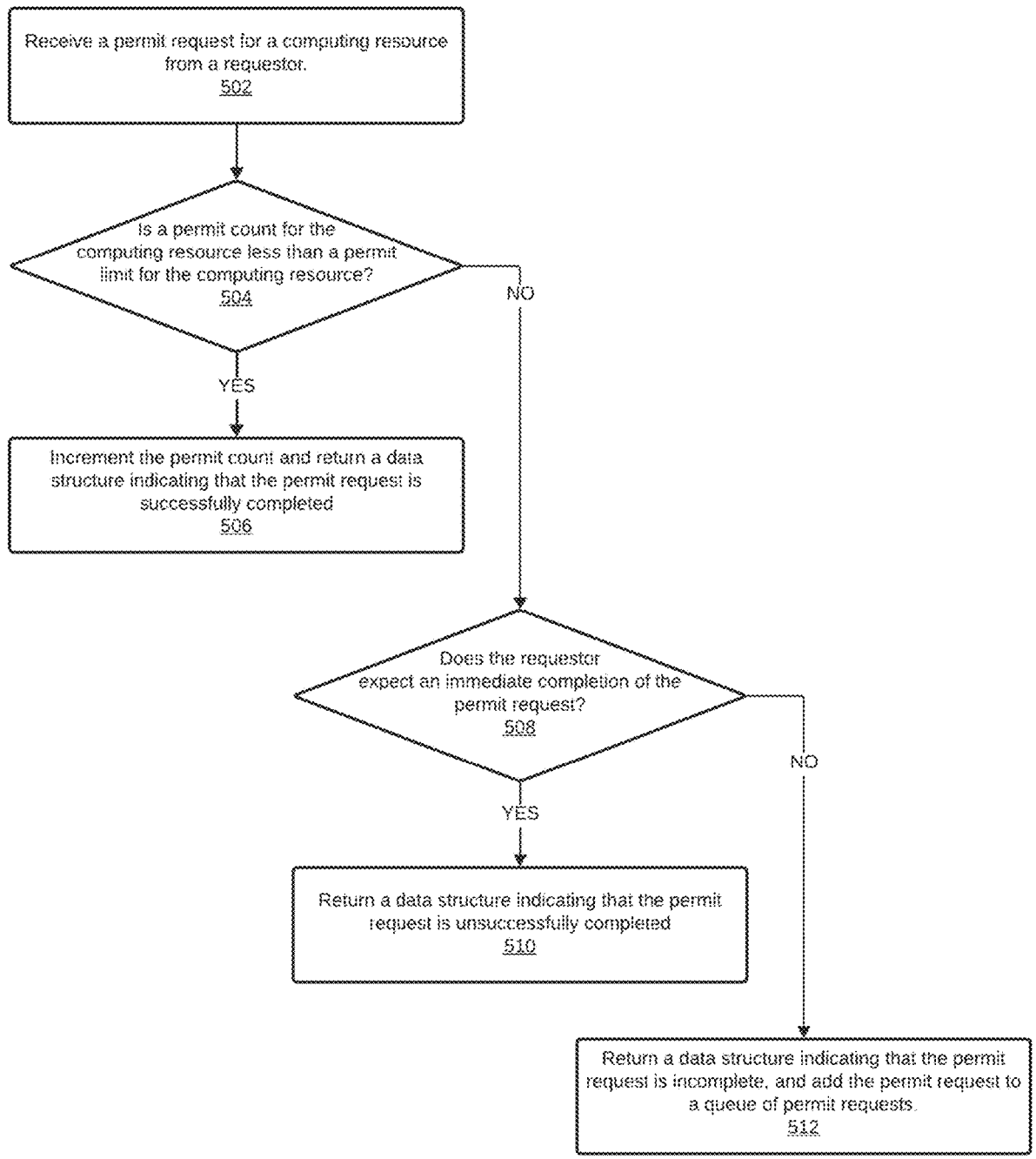
FIG. 5 illustrates an example set of operations for responding to a permit request in accordance with one or more embodiments.

FIG. 5 illustrates an example set of operations for responding to a permit request in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, a permit request for a computing resource is received by a software gate from a requestor (Operation 502). The computing resource is one or more tangible or intangible components and/or aspects of a computing environment. For instance, the computing resource may be a hardware resource; a software resource; a resource combining software and hardware; a measurable quantity that can be requested, allocated, and/or consumed; or some other type of resource. The software gate is a mechanism for policing access to the computing resource. The software gate is responsible for policing access to a single computing resource, or the software gate is responsible for policing access to multiple computing resources. The software gate constrains all types of access to the computing resource, or the software gate constrains specific type(s) of access to the computing resource. The requestor is a currently-running program, service, or other unit of computation. Optionally, the requestor specifies with the permit request a timeout value for the permit request, a type of access that is being requested, and/or other information.

The software gate's responsibility to police access to the computing resource may cause the software gate to complete the permit request if the permit request is not completed by another entity beforehand. The software gate may complete the permit request successfully, or the software gate may complete the permit request unsuccessfully. For instance, the permit request may be granted, the permit request may be denied, or the permit request may fail due to some exception and/or error. The software gate may complete the permit request immediately (i.e., in one of the other operations described in the remainder of Section 3), or the software gate may complete the permit request at some other point in the future.

The software gate may receive the permit request in close temporal proximity to other permit requests for the computing resource. As an example, assume that the requestor is a currently-running program. More specifically, the requestor is a program task of the program that is executing in a thread. The thread performing the program task creates the permit request by invoking a permit request method of the software gate. In this example, other program tasks of the program may be concurrently executing in other threads, and it may be that multiple threads performing multiple program tasks are calling the permit request method in close temporal proximity to one another. Consequently, the software gate may be concurrently processing multiple permit requests.

For purposes of clarity and explanation, subsequent operations are generally described from the perspective of the software gate executing in a single thread. However, it should be understood that the software gate may be concurrently processing multiple permit requests for the computing resource.

In an embodiment, the software gate determines if a permit count is less than a permit limit and proceeds to another operation based on the determination (Operation 504). The permit count is a number of permit requests for the computing resource that have already been granted by the software gate. The permit limit is a restriction on the number of requestors that are allowed to access the computing resource. If the permit count is less than the permit limit (YES in Operation 504), the software gate proceeds to Operation 506. Alternatively, if the permit count is not less than the permit limit (e.g., if the permit count is equal to the permit limit) (NO in Operation 504), the software gate proceeds to Operation 508. In this embodiment, the permit count represents the total number of permits for the computing resource that have been granted by the software gate during runtime. The permit count therefore includes any permits that are actively being used to access the computing resource as well as any permits that have been released by the corresponding requestors. As such, the permit count may increase but will not decrease during the lifetime of the software gate in this embodiment. However, in other embodiments, how the permit count is computed may differ. For instance, in another embodiment, the permit count does not include permits for the computing resource that have been relinquished by the corresponding requestors. Therefore, in this other embodiment, the permit count may decrease if a permit is released.

In an embodiment, the software gate increments the permit count and returns a data structure indicating that the permit request is completed successfully (Operation 506). The permit count is incremented atomically. In this scenario, the permit request is completed successfully because the permit count was found to be less than the permit limit. The successful completion of the permit request corresponds to the requestor being granted at least some form of access to the computing resource. Once the software gate has returned the data structure, the requestor can use the data structure to learn the outcome of the permit request. To this end, the data structure includes method(s) that may be called by the requestor. In an example, calling one method of the data structure reveals to the requestor that the permit request is complete, and calling another method of the data structure reveals to the requestor that the permit request is completed successfully. Having learned that the permit request has been completed successfully, the requestor may subsequently access the computing resource.

In an embodiment, the software gate determines if the requestor is expecting an immediate completion of the permit request and proceeds to another operation based on the determination (Operation 508). The software gate concludes whether or not the requestor is expecting an immediate completion of the permit request based on input from the requestor, characteristics of the permit request, characteristics of the computing resource, and/or some other indicia. In an example, the software gate concludes whether or not the requestor is expecting an immediate completion of the permit request based on a timeout value for the permit request (or lack thereof) that is specified by the requestor. If the requestor is expecting an immediate completion of the permit request (YES in Operation 508), the software gate proceeds to Operation 510. Alternatively, if the requestor is not expecting an immediate completion of the permit request (NO in Operation 508), the software gate proceeds to Operation 512.

In an embodiment, the software gate returns a data structure indicating that the permit request is unsuccessfully completed (Operation 510). In this scenario, the permit request is completed unsuccessfully because (a) the permit count was found to meet the permit limit and (b) the requestor expected an immediate completion of the permit request. The unsuccessful completion of the permit request corresponds to the requestor being denied at least some form of access to the computing resource. Once the software gate has returned the data structure, the requestor can use the data structure to learn that the permit request has been completed unsuccessfully.

In an embodiment, the software gate adds the permit request to a queue of permit requests for the computing resource and returns a data structure indicating that the permit request is incomplete (Operation 512). Returning the data structure serves to inform the requestor that the permit request is currently incomplete and may be completed, successfully or unsuccessfully, at some point in the future. The data structure can subsequently be used by the requestor to check on the status of the permit request. Furthermore, the data structure can be used to register a set of instructions to be performed once the permit request is completed. A set of instructions may provide different operations for different completion scenarios. For instance, a set of instructions may provide one set of operations to be performed if the permit request is granted, another set of operations to be performed if the permit request is denied, and yet another set of operations to be performed if the permit request fails. A set of operations specified for performance upon a successful completion of the permit request may correspond to the remainder of the program task that initiated the permit request. In an example, the data structure includes: method(s) for checking the completion status of the permit request, a method that can be called to get the result of the permit request; a method that can be called to cancel the permit request; method(s) that can be called to register a set of instructions to be performed upon a completion scenario; and/or other methods.

Whether or not the permit request is ultimately completed successfully or unsuccessfully may depend on numerous factors. In an example, the permit request ultimately is completed successfully as a result of the permit limit becoming less than the permit count. Note that, unlike other access control mechanisms that enforce a fixed permit limit, the permit limit enforced by the software gate can be adjusted dynamically. Thus, a permit limit may become less than the permit count as a result of the permit limit increasing (rather than the permit count decreasing). In another example, the permit request is ultimately completed unsuccessfully due to a timeout value of the permit request elapsing while the permit request is still waiting in the queue. In yet another example, the permit request is ultimately completed unsuccessfully due to the requestor canceling the permit request while the permit request is still waiting in the queue. Additional embodiments and/or examples relating to completing a pending permit request are described below in Section 5, titled "Processing a Queue of Permit Requests."

However, it should be understood that, regardless of how the permit request is ultimately completed, the software gate's handling of the incomplete permit request may enable other productive operations to be performed in the interim that might have otherwise been prevented or delayed. As an example, assume that the requestor is a currently-running program. More specifically, the requestor is a program task of the program that is executing in a thread. The permit request is created as a result of the thread invoking a permit request method of the software gate. In response, the permit request method returns the data structure indicating that the permit request is incomplete. In this example, once the permit request has been added to the queue and the data structure indicating that the permit request is incomplete has been returned, the software gate releases the thread. The thread is then free to perform other operations while the permit request is pending. If the software gate had not released the thread (e.g., by requiring the software gate to wait until the completion of the permit request), the thread would have been blocked from performing other operations, and the performance of the computing environment as a whole may have been adversely affected.

4. ALTERING A PERMIT LIMIT

Figure 6:
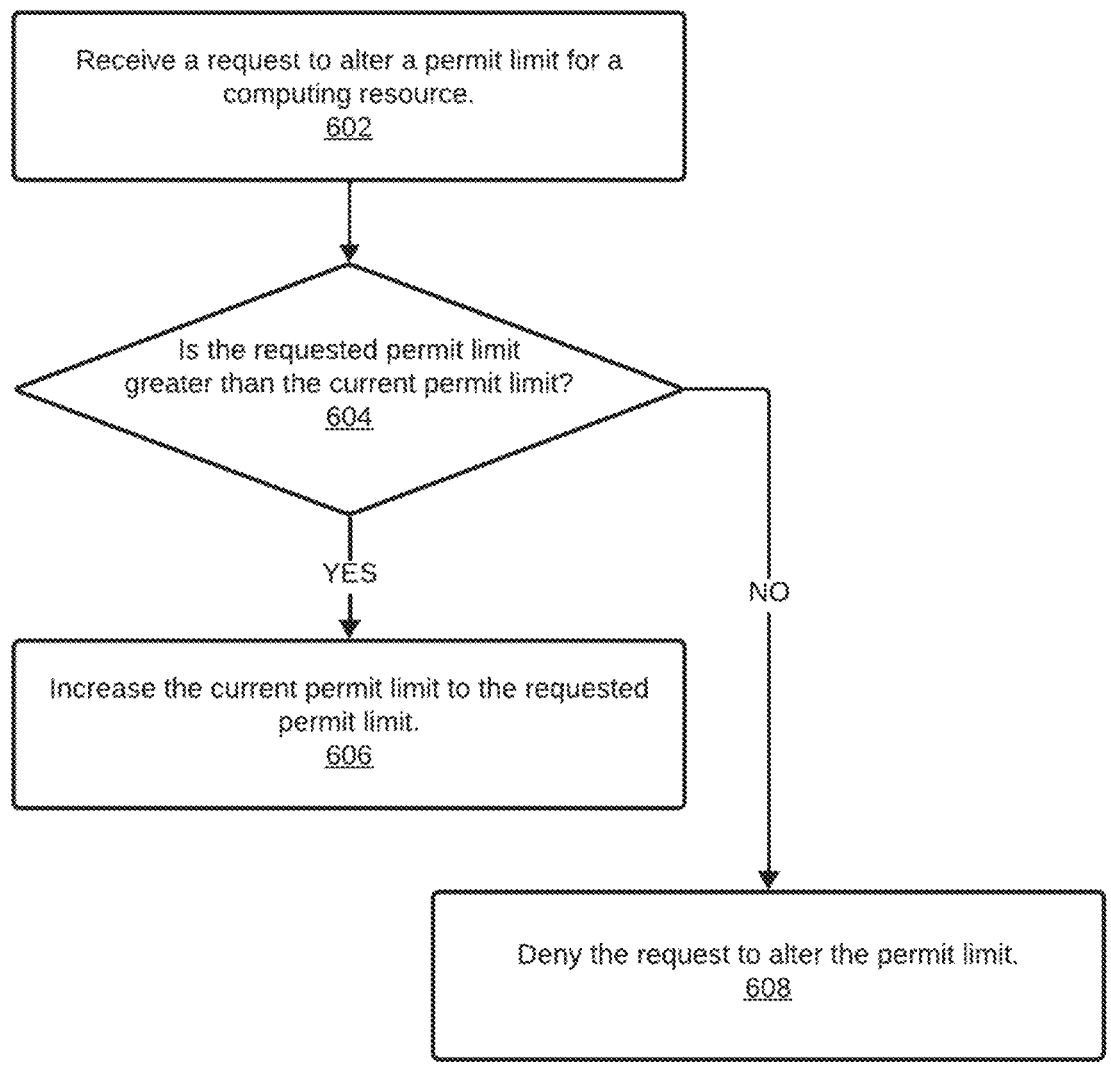
FIG. 6 illustrates an example set of operations for responding to a request to alter a permit limit in accordance with one or more embodiments.

FIG. 6 illustrates an example set of operations for responding to a request to alter a permit limit in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, a software gate receives a request to alter a permit limit for a computing resource (Operation 602). In particular, the request asks that a current permit limit be adjusted to a requested permit limit. The permit limit may be altered multiple times during the lifespan of the computing resource. Thus, the current permit limit is an initial permit limit that was specified when the software gate was created, or the current permit limit is the product of one or more successful requests to alter the permit limit that were previously received by the software gate. Depending on the application, there may be a single party that is allowed to alter the permit limit or there may be multiple parties that are allowed to alter the permit limit. Furthermore, the parties allowed to alter the permit limit may change during the lifespan of the computing resource. In an example, the request to alter the permit limit is created by invoking a permit limit alteration method of the software gate.

The request to alter the permit limit may be received by the software gate in close temporal proximity to other requests to alter the permit limit. As a result, the software gate may be concurrently processing multiple requests to alter the permit limit in multiple threads. However, for purposes of clarity and explanation, subsequent operations are generally described from the perspective of the software gate executing in a single thread.

In an embodiment, the software gate compares the requested permit limit to the current permit limit and proceeds to another operation based on the comparison (Operation 604). In this embodiment, the software gate only allows monotonic alterations to the permit limit. Specifically, the software gate may allow the permit limit to increase but will not allow the permit limit to decrease. Thus, if the requested permit limit is greater than the current permit limit (YES in Operation 604), the software gate proceeds to Operation 606. Alternatively, if the requested permit limit is not greater than the current permit limit (NO in Operation 604), the software gate proceeds to Operation 608. Note that, in this embodiment, the permit count represents the total number of the permits granted by the software gate during the lifetime of the computing resource. Therefore, the permit count (like the permit limit) may increase but will not decrease.

Constraining the permit count and permit limit to monotonic transitions may simplify managing state changes across concurrent operations. However, it should be understood that, in other embodiments, the criteria that the software gate uses to evaluate the request may differ. For instance, in another embodiment the permit count represents the number of permits that are actively being used to access the computing resource, and the software gate may agree to lower the permit limit in certain conditions (e.g., if the permit count is less than the permit limit, if the resources being utilized to manage multiple parties accessing the computing resource reaches a threshold level, etc.).

Additionally, or alternatively, the software gate may evaluate other aspects of the request. For example, the software gate may determine if the request originates from a party that is permitted to alter the permit limit. If the request violates some additional criteria associated with a valid request, the software gate may proceed to Operation 608 regardless of the outcome of any comparison between the current permit limit and the requested permit limit.

In an embodiment, the software gate increases the current permit limit to the requested permit limit (Operation 606). The software gate increases the permit limit atomically. The permit limit is maintained internally by the software, or the permit limit is maintained externally. If multiple valid requests to increase the current permit are being processed in multiple threads, the current permit limit will be set to the highest-requested permit limit. Increasing the current permit limit may trigger the performance of other operations by the software gate. For example, as a result of increasing the permit limit, it may be that at least some of any incomplete permit request(s) waiting in a queue of permit requests can now be completed. Thus, in this example, the software gate may initiate operations for processing the queue of permit requests. Additional embodiments and/or examples relating to processing a queue of permit requests are described below in Section 5, titled "Processing a Queue of Permit Requests."

In an embodiment, the software gate denies the request to alter the permit limit (Operation 608). In this scenario, the request is denied because the requested permit limit is less than the current permit limit. In this scenario, the author of the request may not have intended for the permit limit to be decreased. For example, the request to alter the permit limit may have been received in close proximity to other requests to alter the permit limit. If the request is considered by the software gate shortly after another request is granted, and if the other request sought a higher permit limit than the requested permit limit, the author of the request may have unintentionally asked the software gate to lower the permit limit.

5. PROCESSING A QUEUE OF PERMIT REQUESTS

Figure 7A:
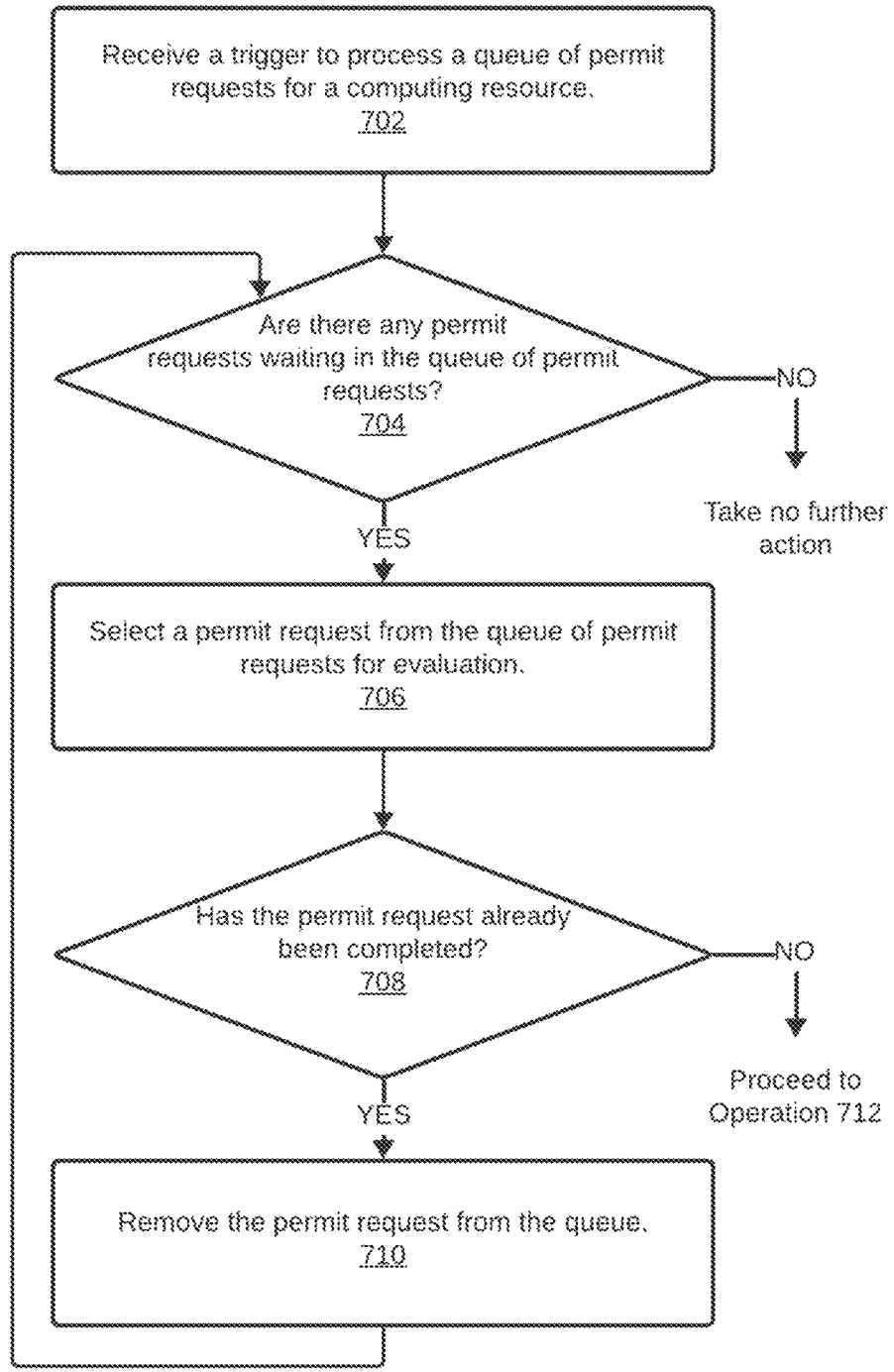
FIGS. 7A & 7B illustrate an example set of operations for processing a queue of permit requests in accordance with one or more embodiments.
Figure 7B:
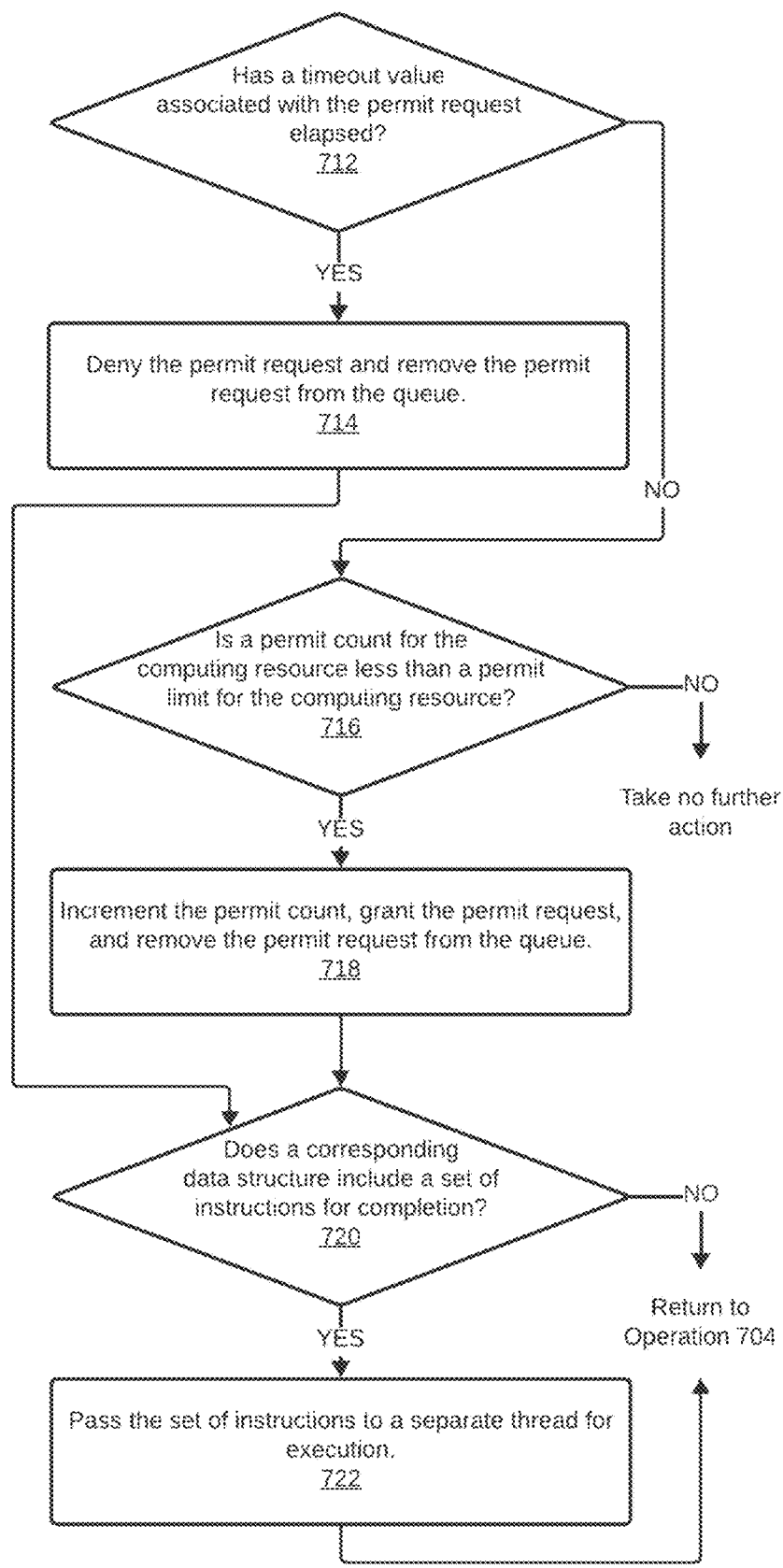

FIG. 7A and FIG. 7B illustrate an example set of operations for processing a queue of permit requests in accordance with one or more embodiments. One or more operations illustrated in FIG. 7A and/or FIG. 7B may be modified, rearranged, or omitted all together. Accordingly, the particular sequence of operations illustrated in FIG. 7A and FIG. 7B should not be construed as limiting the scope of one or more embodiments.

In an embodiment, the software gate receives a trigger that causes the software gate to initiate processing a queue of permit requests (Operation 702). The software gate may be configured to begin processing the queue of permit requests in response to various triggers. Examples occurrences that may trigger the software gate to begin processing the queue include: a permit count becoming less than a permit limit (e.g., as a result of the permit limit increasing or the permit count decreasing); a timeout value of a permit request elapsing; a permit request being canceled by the requestor; and/or various other stimuli.

The software gate may incorporate one method for processing the queue, or the software gate may incorporate multiple methods for processing the queue. If the software gate incorporates multiple methods for processing the queue, the appropriate method for processing the queue may be initiated based on the trigger that is received, the status of the queue, and/or other criteria. For example, an increase in a permit limit may trigger a different method for processing the queue than a timeout value of a permit request elapsing.

The software gate may receive the trigger to process the queue in close temporal proximity to other triggers to process the queue. As a result, the software gate may be concurrently processing the queue in multiple threads. However, subsequent operations are generally described from the perspective of the software gate executing in a single thread for purposes of clarity and understanding.

In an embodiment, the software gate determines if there are any permits requests waiting in the queue of permit requests (Operation 704). If there is at least one permit request waiting in the queue (YES in Operation 704), the software gate proceeds to Operation 706. Alternatively, if there are no permit requests waiting in the queue (NO in Operation 704), the software gate takes no further action.

In an embodiment, the software gate selects a permit request in the queue of permit requests for evaluation (Operation 706). How the software gate selects the permit request may vary depending on the application. The software gate may select the permit request based on the stimuli that triggered processing of the queue, the order of the queue, the characteristics of the computing resource, and/or various other factors. In an example, the processing of the software gate is triggered by the permit count becoming less than the permit limit, and the permit request is selected for evaluation based on the permit request residing at the front of the queue. The manner that the queue is organized in this example may vary depending on the application. For instance, the queue might be organized based on the sequence that the permit requests are received, based on the relative importance of the permit requests, or according to some other format. In another example, the processing of the queue is triggered by the cancelation or timing out of a permit request in the queue. In this example, the permit request selected for evaluation is the canceled or timed out request.

It should be noted that, depending on the length of the queue and the outcome of subsequent determinations, processing of the queue may entail evaluating multiple permit requests. In this scenario, how the software gate selects subsequent permit requests for evaluation may differ from how the software gate selects an initial permit request for evaluation.

In an embodiment, the software gate determines if the permit request has been completed and proceeds to another operation based on the determination (Operation 708). The software gate may determine if the permit request is completed based on a data structure corresponding to the permit request and/or based on other information. The permit request may have already been completed by the software gate, the requestor, or another entity. If the permit request has already been completed (YES in Operation 708), the software gate proceeds to Operation 710. Alternatively, if the permit request is not completed (NO in Operation 708), the software gate proceeds to Operation 712.

In an embodiment, the software gate removes the permit request from the queue of permit requests (Operation 710). In this scenario, the permit request was previously completed by the software gate, the requestor, or another entity. In an example, the permit request has already been completed as a result of the software gate concurrently processing the queue in another thread in a non-atomic manner. In this example, it may be that the permit request was granted (e.g., as a result of the permit limit increasing), the permit request was denied (e.g., as a result of a timeout value for the permit request elapsing), or the permit request failed for some other reason. In another example, the permit request has already been completed unsuccessfully as a result of the requestor canceling the permit request.

In an embodiment, the software gate determines if a timeout value associated with the permit request has elapsed and proceeds to another operation based on the determination (Operation 712). If any timeout value has elapsed (YES in Operation 712), the software gate proceeds to Operation 714. Alternatively, if no timeout value has elapsed (NO in Operation 712), the software gate proceed to Operation 716. Depending on the application, a permit request may not be associated with a timeout value. In an example, any timeout value associated with a permit request is noted in the permit request's entry in the queue.

In an embodiment, the software gate denies the permit request and removes the permit request from the queue (Operation 714). In this scenario, the permit request is denied due to the timeout value of the permit request elapsing. The unsuccessful completion of the permit request corresponds to the requestor being refused at least some form of access to the computing resource. To reflect the permit request being denied, the software gate may update a data structure corresponding to the permit request. The requestor can use the data structure to learn that the permit request has been completed unsuccessfully.

In an embodiment, the software gate compares the permit count to the permit limit and may proceed to another operation based on the comparison (Operation 716). If the permit count is less than the permit limit (YES in Operation 716), the software gate proceeds to Operation 718. Alternatively, if the permit count is not less than the permit limit (e.g., the permit count equals the permit limit) (NO in Operation 716), the software gate takes no further action.

In an embodiment, the software gate increments the permit count, grants the permit request, and removes the permit request from the queue of permit requests (Operation 718). The permit count is incremented atomically. In this scenario, the permit request is completed successfully because the permit count became less than the permit limit prior to the permit request being timed out, canceled, or otherwise completed unsuccessfully. To reflect the permit request being granted, the software gate may update a data structure corresponding to the permit request. The requestor can use the data structure to learn that the permit request has been completed successfully. The successful completion of the permit request corresponds to the requestor being allowed at least some form of access to the computing resource.

In an embodiment, the software gate determines if the corresponding data structure includes a set of instructions to be performed upon the completion of the permit request and proceeds to another operation based on the determination (Operation 720). If the corresponding data structure includes a set of instructions to be performed upon completion of the permit request (YES in Operation 720), the software gate proceeds to Operation 722. Alternatively, if the corresponding data structure does not include a set of instructions to be performed upon completion of the permit request (NO in Operation 720), the software gate returns to Operation 712.

In an embodiment, the software gate delegates the performance of the set of instructions to a separate thread (Operation 722). Delegating the performance of the set of instruction to a separate thread allows the processing of the queue to continue without any delay that would be otherwise experienced while carrying out the set of instructions. In an example, delegating the performance of the set of instructions is accomplished using thread pools and/or custom executors.

6. EXAMPLE EMBODIMENT

A detailed example is described below for purposes of clarity. Components and/or operations described below should be understood as one specific example which may not be applicable to certain embodiments. Accordingly, components and/or operations described below should not be construed as limiting the scope of any of the claims.

Figure 8:
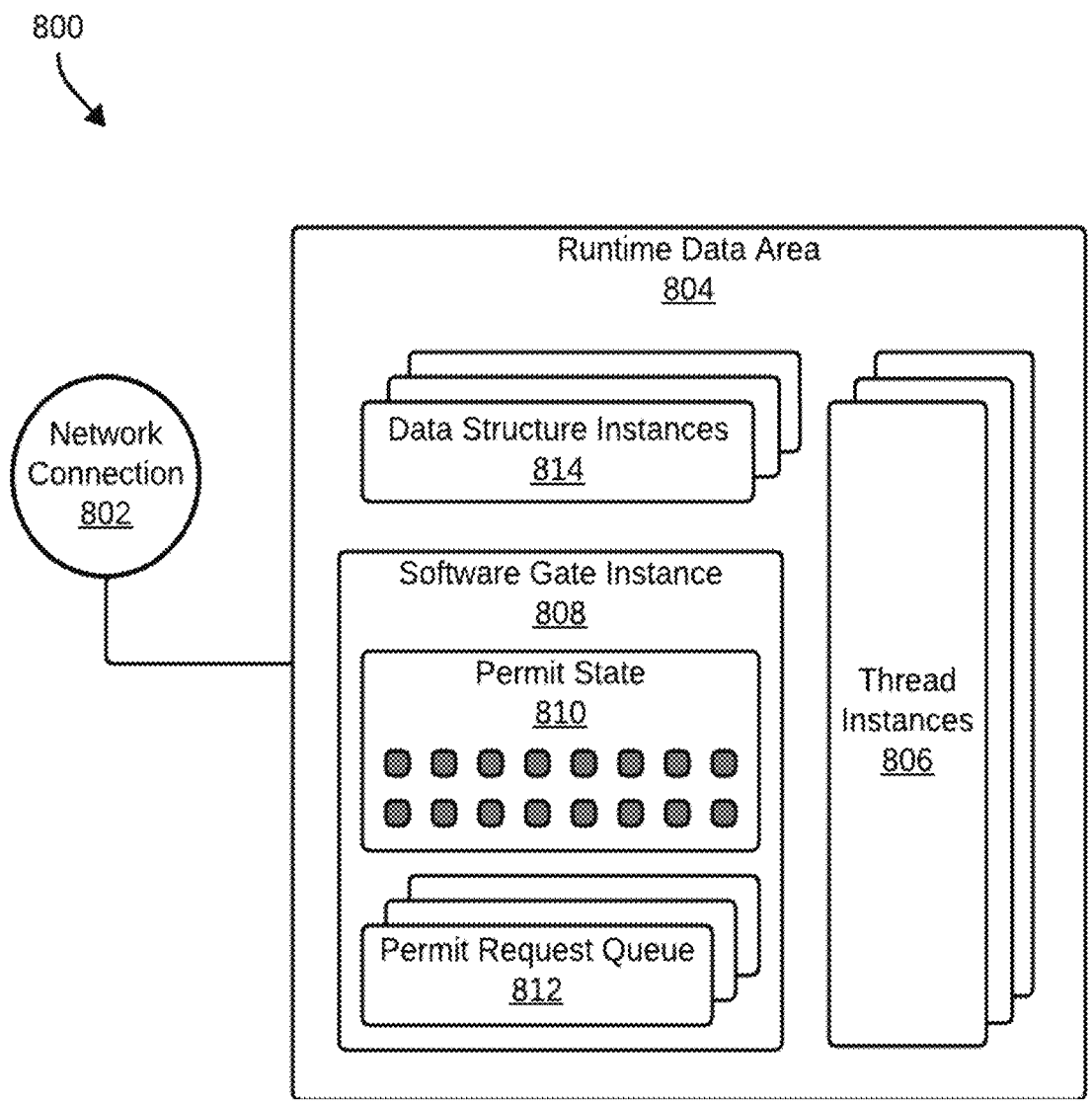
FIG. 8 illustrates an example implementation of an asynchronous access control mechanism in accordance with one or more embodiments.

FIG. 8 illustrates an example computing environment 800 in which techniques described herein may be practiced in accordance with one or more embodiments. As illustrated in FIG. 8, computing environment 800 includes network connection 802 and runtime data area 804. The components illustrated in FIG. 8 may be local to or remote from each other. The components illustrated in FIG. 8 may be implemented in software and/or hardware. Each component may be distributed over multiple applications and/or machines. Multiple components may be combined into one application and/or machine. Operations described with respect to one component may instead be performed by another component.

In an embodiment, network connection 802 is one or more network links. Network connection 802 can be used to create a data stream between peers that are linked by network connection 802. Network connection 802 is associated with a network protocol that supports multiplexing (i.e., the ability to establish multiple streams over a single network connection). Examples of network protocols that support multiplexing include Quic, HTTP/2, SCTP, WebSocket, SSH, M-TLS, and others. The network protocol allows a peer to establish a maximum number of streams that can be created by an opposing peer. Consider an example network connection that links peer A to peer B, and assume that the example network connection accords to the network protocol. In this example, peer A can limit the number of streams between peer A and peer B that may be created by peer B. Furthermore, peer B can limit the number of streams between peer A and peer B that may be created by peer A. A limit imposed on a peer may be altered dynamically by the peer that imposed the limit.

In an embodiment, network connection 802 links runtime data area 804 to a peer. In accordance with the network protocol of network connection 802, the peer is imposing a maximum number of streams that may be created from runtime data area 804. If the number of streams created from runtime data area 804 exceeds the maximum number of streams, a violation of the network protocol may result.

In an embodiment, runtime data area 804 is an execution environment for a program. Successful execution of the program requires access to network connection 802. In particular, one or more program tasks of the program are seeking to establish an additional data stream between runtime data area 804 and the peer.

In an embodiment, runtime data area 804 is implemented in the context of a class-based object-oriented programming language. Examples of class-based object-oriented programming languages include Java, C++, C#, Python, Ruby, and others. The implementation of runtime data area 804 in the context of a class-based object-oriented program is described herein for illustrative purposes and is not intended to define any limits to the disclosure. It should be understood that the techniques described herein are equally applicable to other programming languages and other computing environments. As illustrated in FIG. 8, runtime data area 804 include thread instances 806, software gate instance 808, and data structure instances 814.

In an embodiment, thread instances 806 are runtime objects that serve as self-contained execution environments for program tasks of the program. A program task executing in a thread instance 806 may be performed asynchronously. The performance of a program task may be divided between multiple thread instances 806. A thread instance 806 may generate a permit request, request an alteration to a permit limit, leverage a data structure to check the status of a permit request, cancel a permit request, and/or perform various other operations. In an example, runtime data area 804 is implemented in the context of the Java programming language, and thread instances 806 are instances of the Thread class.

In an embodiment, software gate instance 808 is a runtime object that was instantiated to manage access to network connection 802. To this end, software gate instance 808 includes a permit request method, a permit limit alteration method, method(s) for processing pending permit requests, and/or other methods. A permit request is created by invoking the permit request method on software gate instance 808. In response to the permit request method being invoked, software gate instance 808 returns a data structure instance 814. As illustrated in FIG. 8, software gate instance 808 also includes permit state 810 and permit request queue 812. In an example, runtime data area 804 is implemented in the context of the Java programming language, and software gate instance is an instance of an asynchronous counting gate class. The asynchronous counting gate class is a custom class, or the asynchronous counting gate class is included in a standard Java library. However, it should be noted that, at the time of writing, the asynchronous counting gate class does not exist in the standard Java library.

In an embodiment, the permit state 810 represents a permit count relative to a permit limit. The permit count and permit limit are maintained internally by software gate instance 808. The permit count is the number of permit requests for network connection 802 that have been granted by software gate instance 808. The permit limit corresponds to the maximum number of streams imposed by the peer. The permit count and permit limit may be atomically altered. In an example, any transitions to the permit count or permit limit are monotonic. More specifically, the software gate instance 808 may increase the permit count or permit limit, but will not decrease the permit count or permit limit. Software gate instance 808 will not grant any additional permit requests if the permit count is equal to the permit limit. In the scenario depicted by FIG. 8, the permit count is equal to the permit limit; thus, unless the permit limit is increased, software gate instance 808 will respond to any additional permit requests by returning either (a) a data structure instance 814 indicating that the permit request is unsuccessfully completed or (b) a data structure instance 814 indicating that the permit request is incomplete. If software gate instance 808 returns a data structure instance 814 indicating that a permit request is incomplete, the software gate instance 808 also adds the permit request to the permit request queue 812.

In an embodiment, permit request queue 812 is a list of permit requests maintained internally within software gate instance 808. An example entry in permit request queue 812 references a data structure instance 814 corresponding to a permit request, a timeout value of the permit request, and/or other information. Permit request queue 812 is organized according to the sequence that permit requests are received, according to relative importance of permit requests included in permit request queue 812, and/or according to some other format. A permit request is added to permit request queue 812 if (a) the permit request could not be completed when received by the software gate instance 808 and (b) a timeout value greater than zero is included as a parameter of the permit request. A permit request is removed from permit request queue 812 when the permit request is completed. A permit request waiting in permit request queue 812 may be completed successfully or unsuccessfully. A permit request in permit request queue 812 may be granted if the permit count becomes less than the permit limit prior to the permit request being timed out, canceled, or otherwise completed unsuccessfully. The permit count may become less than the permit limit if the permit limit adjustment method is successfully employed to increase the permit limit. As such, software gate instance 808 may begin processing permit request queue 812 in response to a successful invocation of the permit limit adjustment method. In this scenario, software gate instance 808 will iterate through permit request queue 812 until no permit requests are remaining in permit request queue 812 or until the permit count equals the new permit limit.

In an embodiment, data structure instances 814 are runtime objects that can be used to communicate and manage the state of permit requests. Each data structure instance 815 corresponds to a permit request. If a permit request can be completed at the time permit request is made, a corresponding data structure instance can supply the result of permit request immediately. If a permit request cannot be completed at the time the permit request is made, a corresponding data structure instance can supply the result of the permit request at some point in the future. In an example, the runtime data area 804 is implemented in the context of the Java programming language, and data structure instances 814 are instances of the CompletableFuture class or another reference type that is suitable for asynchronous computing.

In an embodiment, a data structure instance 814 corresponding to a permit request includes method for checking if the permit request is complete, a method for checking if the permit request is completed normally, a method for checking if the permit request completed exceptionally, a method for checking if the permit request is canceled, a method for getting the result of the permit request, a method for canceling the permit request, method(s) that can be called to register the performance of sets of instructions in differing completion scenarios, and/or other methods. In one example, if an incomplete permit request waiting in permit request queue 812 is completed, the internal state of a corresponding data structure instance 814 is updated to reflect the completion of the permit request, and method(s) for checking the status of the permit request can return result(s) based on the updated internal state of the data structure instance 814. In another example, if an incomplete permit request waiting in permit request queue is completed, method(s) for checking the status of the permit request can return result(s) based on information external to the data structure instance 814.

In an embodiment, an internal state of a data structure instance 814 corresponding to a pending permit request can be transitioned to one of several different states to reflect how the permit request is completed. If the permit request is granted, the internal state of the data structure instance 814 is transitioned from an incomplete state to a normal completion state. If the permit request is denied, the internal state of the data structure instance 814 is transitioned from an incomplete state to an exceptional completion state. If the permit request is canceled, the internal state of the data structure instance 814 is transitioned from an incomplete state to a canceled state. The result of the permit request can also be stored to the data structure instance 814. For example, if the permit request is granted, the result (i.e., true) is stored to the data structure instance 814, and if the permit request is denied, the result (i.e., false) is stored to the data structure instance 814.

In an embodiment, a data structure instance 814 corresponding to a permit request includes a set of instructions that are to be performed upon the completion of the permit request. A data structure instance 814 may include one or more sets of instructions that are registered by the requestor for performance upon some completion of the permit request. A data structure instance 814 may include different sets of instructions for different completion scenarios (e.g., the permit request being granted, the permit request being denied as a result of timing out or otherwise failing, the permit request being canceled, etc.). A data structure instance 814 may accommodate an executor functionality that allows a set of completion instructions to be delegated to a thread instance 806 other than the thread instance 806 that is performing a method of software gate instance 808. As an example, assume that permit request queue 810 is being processed by a calling thread instance 806 executing a method of software gate instance 808. While iterating through the permit request queue 810, assume that a permit request corresponding to a data structure instance 814 is granted. Upon the permit request being granted, the data structure instance 814 is completed, and the data structure instance 814 is passed an executor that is used to create a separate thread instance 806 for executing a set of instructions registered in the data structure instance 814. By delegating the set of instructions to the separate thread instance 806, the calling thread instance 806 instance 808 is freed to continue iterating through the permit request queue 810 without the delay that would otherwise be incurred while performing the set of instructions.

7. PRACTICAL APPLICATIONS, ADVANTAGES, & IMPROVEMENTS

Mechanisms for restricting access to a computing resources are useful in a wide variety of different computing environments. However, policing access to a computing resource can be more complex in certain computing environments. In particular, the task of an access control mechanism deployed in a multi-thread computing environment can be especially challenging because multiple threads may attempt to concurrently interact with the access control mechanism (e.g., to acquire a permit, to release a permit, etc.). If an access control mechanism evaluates each concurrent request in isolation (i.e., with no regard to the other concurrent requests), conflicting state changes, race conditions, deadlock, thread starvation, or other concurrency issues may result.

In view of the foregoing, the ability to evaluate concurrent requests in a manner that produces harmonious results is often imperative for an access control mechanism operating in a multi-thread computing environment. To this end, many access control mechanisms that are employed in multi-thread computing environments (e.g., semaphores, locks, countdown latches, exchangers, phasers, etc.) utilize thread blocking. For example, an access control mechanism may block a thread from performing other operations until a permit request initiated by the thread is completed.

Blocking threads can simplify the management of concurrent requests. However, thread blocking can also be associated with inefficient utilization of resources, delayed task execution, and poor scalability. Furthermore, aggressive thread blocking can also exacerbate other concurrency issues such as flooding. The desirability of an access control mechanism that relies on thread blocking will vary depending on the circumstances of any given application. However, the negative effects of blocking a thread can generally be expected to scale relative to the duration that a permit request remains incomplete. Thus, an access control mechanism that tends to receive permit requests that can remain incomplete for extended periods may experience the drawbacks of thread blocking more acutely. For instance, an access control mechanism that evaluates permit requests based on a dynamic and unpredictable threshold (e.g., maximum number of streams for a network connection that supports multiplexing) may be particularly susceptible to the adverse effects of thread blocking.

To avoid the issues arising from thread blocking, the software gate of the present disclosure enables a program task executing in a thread that generates a permit request to be performed asynchronously. In other words, the software gate does not block the thread from performing other operations while the permit request is incomplete. Lacking the ability to perform the program task asynchronously, the program task would continue to occupy the thread until the ultimate resolution of the permit request at some point in the future, with no guarantee that the permit request will be completed successfully. By releasing the thread to perform other operations, the overall productivity of the computing environment may be increased.

In addition to circumventing the hinderances associated with thread blocking, the software gate of the present disclosure is suitable for a wider range of applications than other access control mechanisms. For instance, an example mechanism commonly used to police access to a computing resource prevents a number of active permits from exceeding a fixed permit limit. If a permit is released, the number of active permits decreases; if a new permit is granted, the number active permits increases; and the permit limit does not change. Note that if the number of active permits is equal to the fixed permit limit, no additional permit requests can be granted until an active permit is relinquished. In contrast, the software gate of the present disclosure polices access to a computing resource by preventing a dynamic permit count from exceeding a dynamic permit limit. Enforcing a dynamic permit limit rather than a fixed permit limit makes the software gate inherently better suited for policing access to computing resources that may be associated with shifting maximums (e.g., a network connection associated with a network protocol that supports multiplexing and imposes a dynamic maximum number of streams). Moreover, enforcing a dynamic permit limit rather than a fixed permit limit allows the software gate to better adapt to fluctuating workloads. For example, consider a scenario where a fixed permit limit only allows two parties to possess active permits for a computing resource. Assume that managing the second party's access requires significantly more resources than managing the first party's access. In this example, the second party relinquishes access to the computing resource. As a result, a third party is subsequently granted a permit to access the computing resource. However, the resources required to manage the third party's access are much fewer than the resources that were being consumed while managing the second party's access. As such, the computing resource could now accommodate access by more than two parties. However, due to the permit limit being fixed, the example mechanism cannot adapt to the changed circumstances. In contrast, the software gate ability to dynamically change the permit limit would allow the software gate to adapt to the new conditions, and, therefore, make better use of the computing resource.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic or optical signals that carry digital streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

9. MISCELLANEOUS; EXTENSIONS

Unless otherwise defined, all terms (including technical and scientific terms) are to be given their ordinary and customary meaning to a person of ordinary skill in the art, and are not to be limited to a special or customized meaning unless expressly so defined herein.

This application may include references to certain trademarks. Although the use of trademarks is permissible in patent applications, the proprietary nature of the marks should be respected, and every effort made to prevent their use in any manner which might adversely affect their validity as trademarks.

Embodiments are directed to a system with one or more devices that include a hardware processor and that are configured to perform any of the operations described herein and/or recited in any of the claims below.

In an embodiment, one or more non-transitory computer-readable storage media comprises instructions that, when executed by one or more hardware processors, cause performance of any of the operations described herein and/or recited in any of the claims.

In an embodiment, a method comprises operations described herein and/or recited in any of the claims, the method being executed by at least one device including a hardware processor.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   responsive to receiving a first request from a first thread to access a computing resource: determining, by a software gate configured to manage access to the computing resource, if a number of permits granted to access the computing resource meets a permit limit;
   responsive to determining that the number of permits granted meets the permit limit: returning, by the software gate to the first thread, a first data structure that communicates a first result of the first request, wherein the first result indicates that the first request is incomplete;
   after returning the first data structure: determining, by the software gate, that the number of permits granted is less than the permit limit; and
   responsive to determining that the number of permits granted is less than the permit limit: updating, by the software gate, the first result to indicate that a permit to access the computing resource has been granted;
   wherein the first thread uses the first data structure to determine that the first result has changed;
   wherein the software gate does not block the first thread from performing operations in a time between (a) the software gate returning the first data structure and (b) the first thread using the first data structure to determine that the first result has changed;
   wherein the method is performed by at least one device including a hardware processor.

2. The method of claim 1, further comprising:
   further responsive to determining that the number of permits granted meets the permit limit: adding, by the software gate, the first request to a queue of incomplete requests; and
   wherein updating the first result to indicate that the first result has changed is performed further responsive to determining that the first request is next in the queue.

3. The method of claim 1, further comprising:
   responsive to receiving a second request from a second thread to access the computing resource: determining, by the software gate, if the number of permits granted meets the permit limit; and
   responsive to determining that the number of permits granted is less than the permit limit:
   returning, by the software gate to the second thread, a second data structure that references a second result of the second request, wherein the second result indicates that a permit to access the computing resource has been granted; and
   incrementing the number of permits granted to access the computing resource.

4. The method of claim 1, further comprising:
prior to receiving the first request from the first thread:
responsive to receiving a third request from a third thread to access the computing resource: determining, by the software gate, (a) if the number of permits granted to access the computing resource meets the permit limit and (b) if the third request comprises a timeout condition; and
responsive to determining (a) that the number of permits granted meets the permit limit and (b) a timeout condition of the third request: returning, by the software gate to the third thread, a third data structure that indicates that the third request is denied.

5. The method of claim 1:
wherein the first request comprises a timeout condition; and
wherein updating the first result is performed further responsive to determining that the timeout condition has not been satisfied.

6. The method of claim 1, further comprising:
receiving, by the software gate, a request to increase the permit limit; and
responsive to the request to increase the permit limit: increasing, by the software gate, the permit limit;
wherein determining that the number of permits granted is less than the permit limit is performed responsive to increasing the permit limit.

7. The method of claim 1:
wherein the first data structure is an instance of a class;
wherein updating, by the software gate, the first result to indicate that the permit to access the computing resource has been granted comprises updating the first data structure;
wherein the first thread calls a method of the first data structure to access the first result.

8. The method of claim 1, wherein the computing resource is a QUIC connection, and the software gate is configured to manage a number of streams permitted for the QUIC connection.

9. The method of claim 1, wherein the first data structure comprises a set of one or more instructions to be performed subsequent to the permit to access the computing resource being granted, and further comprising:
returning, by the software gate to a second thread, the set of one or more instructions; and
executing, by the second thread, the set of one or more instructions.

10. The method of claim 1, wherein the computing resource is a network connection, wherein the network connection is associated with a network protocol, wherein the network protocol supports multiplexing, wherein the network connection is associated with a maximum number of streams that can be created through the network connection, wherein the maximum number of streams can be altered dynamically, and wherein the maximum number of streams corresponds to the permit limit.

11. One or more non-transitory computer-readable media comprising instructions that, when executed by one or more hardware processors, cause performance of operations comprising:
responsive to receiving a first request from a first thread to access a computing resource: determining, by a software gate configured to manage access to the computing resource, if a number of permits granted to access the computing resource meets a permit limit;
responsive to determining that the number of permits granted meets the permit limit: returning, by the software gate to the first thread, a first data structure that communicates a first result of the first request, wherein the first result indicates that the first request is incomplete;
after returning the first data structure: determining, by the software gate, that the number of permits granted is less than the permit limit; and
responsive to determining that the number of permits granted is less than the permit limit: updating, by the software gate, the first result to indicate that a permit to access the computing resource has been granted;
wherein the first thread uses the first data structure to determine that the first result has changed;
wherein the software gate does not block the first thread from performing operations in a time between (a) the software gate returning the first data structure and (b) the first thread using the first data structure to determine that the first result has changed.

12. The one or more non-transitory computer-readable media of claim 11, the operations further comprising:
further responsive to determining that the number of permits granted meets the permit limit: adding, by the software gate, the first request to a queue of incomplete requests; and
wherein updating the first result to indicate that the first result has changed is performed further responsive to determining that the first request is next in the queue.

13. The one or more non-transitory computer-readable media of claim 11, the operations further comprising:
responsive to receiving a second request from a second thread to access the computing resource: determining, by the software gate, if the number of permits granted meets the permit limit;
responsive to determining that the number of permits granted is less than the permit limit:
returning, by the software gate to the second thread, a second data structure that references a second result of the second request, wherein the second result indicates that a permit to access the computing resource has been granted; and
incrementing the number of permits granted to access the computing resource.

14. The one or more non-transitory computer-readable media of claim 11, the operations further comprising:
wherein the first request comprises a timeout condition;
wherein updating the first result is performed further responsive to determining that the timeout condition has not been satisfied.

15. The one or more non-transitory computer-readable media of claim 11, the operations further comprising:
receiving, by the software gate, a first permit limit alteration request, wherein the first permit limit alteration request specifies a first value;
based on comparing the permit limit to the first value, determining that the first value is greater than the permit limit;
responsive to determining that the first value is greater than the permit limit: increasing, by the software gate, the permit limit to the first value,
wherein determining that the number of permits granted is less than the permit limit is performed responsive to increasing the permit limit;
receiving, by the software gate, a second permit limit alteration request, wherein the second permit limit alteration request specifies a second value;

based on comparing the second value to the first value, determining that the second value is not greater than the first value; and responsive to determining that the second value is not greater than the first value: declining the second permit limit alteration request, wherein the number of permits granted to access the computing resource is at least one of (a) a first number of permits granted to access the computing resource by the software gate or (b) a second number of permits granted to access the computing resource during a lifetime of the computing resource.

16. The one or more non-transitory computer-readable media of claim 11, the operations further comprising:

wherein the first data structure is an instance of a class;

wherein updating, by the software gate, the first result to indicate that the permit to access the computing resource has been granted comprises updating the first data structure;

wherein the first thread calls a method of the first data structure to access the first result.

17. The one or more non-transitory computer-readable media of claim 11, wherein the computing resource is a QUIC connection, and the software gate is configured to manage a number of streams permitted for the QUIC connection.

18. The one or more non-transitory computer-readable media of claim 11, wherein the first data structure comprises a set of one or more instructions to be performed subsequent to the permit to access the computing resource being granted, and further comprising:

returning, by the software gate to a second thread, the set of one or more instructions; and executing, by the second thread, the set of one or more instructions.

19. A system comprising:

at least one device including a hardware processor;

the system being configured to perform operations comprising:

responsive to receiving a first request from a first thread to access a computing resource: determining, by a software gate configured to manage access to the computing resource, if a number of permits granted to access the computing resource meets a permit limit;

responsive to determining that the number of permits granted meets the permit limit: returning, by the software gate to the first thread, a first data structure that communicates a first result of the first request, wherein the first result indicates that the first request is incomplete;

after returning the first data structure: determining, by the software gate, that the number of permits granted is less than the permit limit; and responsive to determining that the number of permits granted is less than the permit limit: updating, by the software gate, the first result to indicate that a permit to access the computing resource has been granted;

wherein the first thread uses the first data structure to determine that the first result has changed;

wherein the software gate does not block the first thread from performing operations in a time between (a) the software gate returning the first data structure and (b) the first thread using the first data structure to determine that the first result has changed.

20. The system of claim 19, the operations further comprising:

further responsive to determining that the number of permits granted meets the permit limit: adding, by the software gate, the first request to a queue of incomplete requests, wherein updating the first result to indicate that the first result has changed is performed further responsive to determining that the first request is next in the queue;

responsive to receiving a second request from a second thread to access the computing resource: determining, by the software gate, if the number of permits granted meets the permit limit;

responsive to determining that the number of permits granted is less than the permit limit:

returning, by the software gate to the second thread, a second data structure that references a second result of the second request, wherein the second result indicates that a permit to access the computing resource has been granted; and incrementing the number of permits granted to access the computing resource, wherein the first request comprises a timeout condition and updating the first result is performed further responsive to determining that the timeout condition has not been satisfied.

* * * * *